(12) United States Patent
Itoh

(10) Patent No.: US 10,261,403 B2
(45) Date of Patent: Apr. 16, 2019

(54) WAVELENGTH CONVERSION ELEMENT, LIGHT SOURCE APPARATUS, AND PROJECTOR

(71) Applicant: SEIKO EPSON CORPORATION, Tokyo (JP)

(72) Inventor: Yoshitaka Itoh, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/920,333

(22) Filed: Mar. 13, 2018

(65) Prior Publication Data
US 2018/0284584 A1    Oct. 4, 2018

(30) Foreign Application Priority Data
Mar. 28, 2017    (JP) ................................ 2017-063251

(51) Int. Cl.
G03B 21/00    (2006.01)
G03B 21/20    (2006.01)

(52) U.S. Cl.
CPC ....... *G03B 21/2053* (2013.01); *G03B 21/204* (2013.01)

(58) Field of Classification Search
CPC .... F21V 9/30; G03B 21/2033; G03B 21/2066
See application file for complete search history.

(56) References Cited

U.S. PATENT DOCUMENTS

| 8,556,432 B2 * | 10/2013 | Masuda | G03B 21/204 |
| | | | 353/31 |
| 2011/0051102 A1 | 3/2011 | Ogura et al. | |
| 2013/0221826 A1* | 8/2013 | Okumura | H05B 33/145 |
| | | | 313/45 |
| 2015/0226389 A1* | 8/2015 | Kasugai | G02B 26/008 |
| | | | 353/31 |

FOREIGN PATENT DOCUMENTS

| JP | 2011-053320 A | 3/2011 |
| JP | 2012-27052 A | 2/2012 |
| JP | 2016-114728 A | 6/2016 |

* cited by examiner

*Primary Examiner* — Andrew J Coughlin
(74) *Attorney, Agent, or Firm* — Oliff PLC

(57) ABSTRACT

A wavelength conversion element according to an aspect of the invention includes a wavelength conversion section having a first surface, a reflection section having a reflection surface that reflects the fluorescence, a light-transparent bonding section that bonds the wavelength conversion section to the reflection section, and a refractive index interface which is provided between the first surface and the reflection surface and where a first medium and a second medium having refractive indices different from each other are in contact with each other. The refractive index of the first medium is higher than the refractive index of the second medium, and regarding the fluorescence traveling from the wavelength conversion section toward the reflection section, the angular distribution of the fluorescence having passed through the refractive index interface is narrower than the angular distribution of the fluorescence before passing through the refractive index interface.

20 Claims, 8 Drawing Sheets

WAVELENGTH CONVERSION ELEMENT, LIGHT SOURCE APPARATUS, AND PROJECTOR

BACKGROUND

1. Technical Field

The present invention relates to a wavelength conversion element, a light source apparatus, and a projector.

2. Related Art

In a projector, a light source apparatus capable of outputting high-intensity light is required to increase the luminance of a projected image. To this end, a light source apparatus including an excitation light source and a wavelength conversion element has been recently proposed. In the light source apparatus, the wavelength conversion element is irradiated with excitation light emitted from the excitation light source, such as a semiconductor laser or a light emitting diode, to produce fluorescence, which is used as part of illumination light.

For example, JP-A-2012-27052 discloses a light source apparatus including lasers, a fluorescing substrate that is irradiated with blue light to produce green or red light, and a quadrangular pyramidal prism array on which the light from the fluorescing substrate is incident. JP-A-2012-27052 describes that the fluorescence orientation directivity is improved by causing the fluorescence to undergo multiple reflection between the fluorescing substrate and the prism array.

JP-A-2011-53320 discloses a light source apparatus including an excitation light source that outputs blue light and a fluorescing wheel that is irradiated with the blue light to produce green light. JP-A-2011-53320 describes that high-intensity fluorescence is produced by optimizing the weight concentration of a phosphor contained in a phosphor layer and the film thickness of the phosphor with respect to the thickness of the phosphor layer.

A wavelength conversion element, such as a fluorescing substrate, is classified into a transmissive wavelength conversion element that emits fluorescence through the surface opposite the surface on which excitation light is incident and a reflective wavelength conversion element that emits fluorescence through the surface on which excitation light is incident.

In general, a phosphor is characterized in that its light emission efficiency decreases as the temperature increases. The light source apparatus described in JP-A-2012-27052, in which a transmissive wavelength conversion element is used, has a problem of difficulty in efficiently dissipating heat generated in a phosphor layer. Therefore, even if the fluorescence orientation directivity can be improved, high light emission efficiency cannot be achieved, and it is therefore difficult to achieve a wavelength conversion element capable of producing high-intensity fluorescence.

On the other hand, in the light source apparatus described in JP-A-2011-53320, in which the fluorescing wheel is so configured that the area where the phosphor layer is formed has a reflective structure but the area where the blue light is diffused has a transmissive structure, it is difficult for the fluorescing wheel as a whole to dissipate the heat from the phosphor layer.

Further, the fluorescing wheel in JP-A-2011-53320 has a configuration in which a reflection surface made, for example, of silver, a transparent protective film made, for example, of magnesium fluoride, and the phosphor layer are sequentially layered on a metal substrate. To achieve high-optical-intensity fluorescence, it is important to increase the amount of light reflected off the reflection surface described above and traveling in the direction opposite the direction in which the excitation light is incident. To increase the amount of the fluorescence reflected off the reflection surface, it is effective to increase the reflectance at the reflection surface.

In the case where the reflection surface is formed by using silver, as in JP-A-2011-53320, high reflectance is achieved, but there are the following problems: Reflection loss of about 3 to 5% occurs; and the reflectance lowers when the angle of incidence increases. Further, the silver absorbs the light and generates heat, resulting in degradation of the silver due to thermal oxidation. A reflection surface made of silver has a variety of problems, such as those described above, and it is undesirably difficult to increase the reflectance.

SUMMARY

An advantage of some aspects of the invention is to provide a wavelength conversion element capable of increasing the amount of fluorescence reflected off a reflection surface as compared with the amount in related art to produce high-optical-intensity fluorescence. Another advantage of some aspects of the invention is to provide a light source apparatus including the wavelength conversion element. Still another advantage of some aspects of the invention is to provide a projector including the light source apparatus.

A wavelength conversion element according to an aspect of the invention includes a wavelength conversion section having a first surface on which excitation light is incident and through which fluorescence exits, a reflection section having a reflection surface that reflects the fluorescence, a light-transparent bonding section that bonds the wavelength conversion section to the reflection section, and a refractive index interface which is provided between the first surface and the reflection surface and where a first medium and a second medium having refractive indices different from each other are in contact with each other. The refractive index of the first medium located on the-first-surface-side of the refractive index interface is higher than the refractive index of the second medium located on the reflection-surface-side of the refractive index interface, and regarding the fluorescence traveling from the wavelength conversion section toward the reflection section, an angular distribution of the fluorescence having passed through the refractive index interface is narrower than the angular distribution of the fluorescence before passing through the refractive index interface.

In the wavelength conversion element according to the aspect of the invention, regarding the fluorescence traveling from the wavelength conversion section toward the reflection section, the angular distribution of the fluorescence having passed through the refractive index interface is narrower than the angular distribution of the fluorescence before passing through the refractive index interface, whereby the reflectance at the reflection surface can be increased, and the amount of fluorescence reflected off the reflection surface can therefore be increased. A wavelength conversion element capable of producing high-optical-intensity fluorescence can thus be achieved.

In the wavelength conversion element according to the aspect of the invention, the refractive index interface may be formed of a second surface of the wavelength conversion section that is a surface opposite the first surface thereof or a first surface of the bonding section that is a surface located on a side facing the wavelength conversion section.

According to the configuration described above, the refractive index interface can be the second surface of the wavelength conversion section that is the surface opposite the first surface thereof or the first surface of the bonding section that is a surface located on the side facing the wavelength conversion section. A simply structured wavelength conversion element can therefore be provided.

The wavelength conversion element according to the aspect of the invention may further include a first refractive index section provided between the wavelength conversion section and the bonding section. In this case, the wavelength conversion section may be made of the first medium, and the first refractive index section may be made of the second medium.

According to the configuration described above, the surface where the wavelength conversion section is in contact with the first refractive index section can be the refractive index interface. In this case, appropriately selecting the second medium to adjust the refractive index of the first refractive index section allows control of the angular distribution of the fluorescence having passed through the refractive index interface.

The wavelength conversion element according to the aspect of the invention may further include a second refractive index section provided between the wavelength conversion section and the bonding section. In this case, the second refractive index section may be made of the first medium, and the bonding section may be made of the second medium.

According to the configuration described above, the surface where the second refractive index section is in contact with the bonding section can be the refractive index interface. In this case, appropriately selecting the first medium to adjust the refractive index of the second refractive index section allows control of the angular distribution of the fluorescence having passed through the refractive index interface.

The wavelength conversion element according to the aspect of the invention may further include a first refractive index section so provided between the wavelength conversion section and the bonding section as to be in contact with the bonding section and a second refractive index section so provided between the wavelength conversion section and the bonding section as to be in contact with the wavelength conversion section. In this case, the first refractive index section may be made of the second medium, and the second refractive index section may be made of the first medium.

According to the configuration described above, the surface where the first refractive index section is in contact with the second refractive index section can be the refractive index interface. In this case, appropriately selecting the first and second media to adjust the refractive indices of the first and second refractive index sections allows control of the angular distribution of the fluorescence having passed through the refractive index interface.

In the wavelength conversion element according to the aspect of the invention, the refractive index interface may have a shape containing a plurality of pyramids.

According to the configuration described above, when the fluorescence passes through the refractive index interface having the shape containing the plurality of pyramids, the proportion of the fluorescence that is incident on the reflection surface of the reflection section at small angles of incidence can be increased.

In the wavelength conversion element according to the aspect of the invention, a bottom surface of each of the pyramids may have a polygonal shape.

According to the configuration described above, optimally designing the polygonal shape allows the plurality of pyramids to be arranged in a closest packing state. The effect of increasing the proportion of the fluorescence that is incident on the reflection surface at small angles of incidence can therefore be maximized.

In the wavelength conversion element according to the aspect of the invention, the reflection section may be formed of a dielectric multilayer film.

In general, a dielectric multilayer film has a high dependence of the reflectance on the angle of incidence but is likely to achieve high reflectance as compared with a metal film in a region of a narrow incident angle range. In the wavelength conversion element according to the aspect of the invention, the angle of incidence of the fluorescence with respect to the reflection surface can be reduced, so that the incident angle range can be narrowed, as described above, whereby the reflectance of the fluorescence can be increased by making use of the characteristics of a dielectric multilayer film.

The wavelength conversion element according to the aspect of the invention may further include a substrate so provided as to be in contact with the reflection section.

According to the configuration described above, the substrate can support the laminate of the wavelength conversion section, the reflection section, and other components, and selecting a substrate having high thermal conductivity allows enhancement of the heat dissipation capability of the wavelength conversion element.

A light source apparatus according to another aspect of the invention includes the wavelength conversion element according to the aspect of the invention and an excitation light source that emits the excitation light.

According to the configuration described above, high-optical-intensity fluorescence is achieved, whereby a high-intensity light source apparatus can be provided.

A projector according to another aspect of the invention includes the light source apparatus according to the aspect of the invention, a light modulator that modulates light from the light source apparatus in accordance with image information to form image light, and a projection system that projects the image light.

According to the configuration described above, since the light source apparatus capable of producing high-optical-intensity fluorescence is used, a projector capable of producing a high-luminance projection image can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will be described below with reference to FIGS. 1 to 6.

A projector according to the present embodiment is an example of a liquid crystal projector including a semiconductor laser and a wavelength conversion element.

In the following drawings, components are drawn at different dimensional scales in some cases for clarity of each of the components.

The projector according to the present embodiment is a projection-type image display apparatus that displays color video images on a screen (projection surface). The projector uses three light modulators corresponding to color light fluxes, red light, green light, and blue light. The projector uses, as a light emitting device of the light source apparatus, a semiconductor laser (laser diode) capable of emitting high-luminance, high-intensity light.

Figure 1:
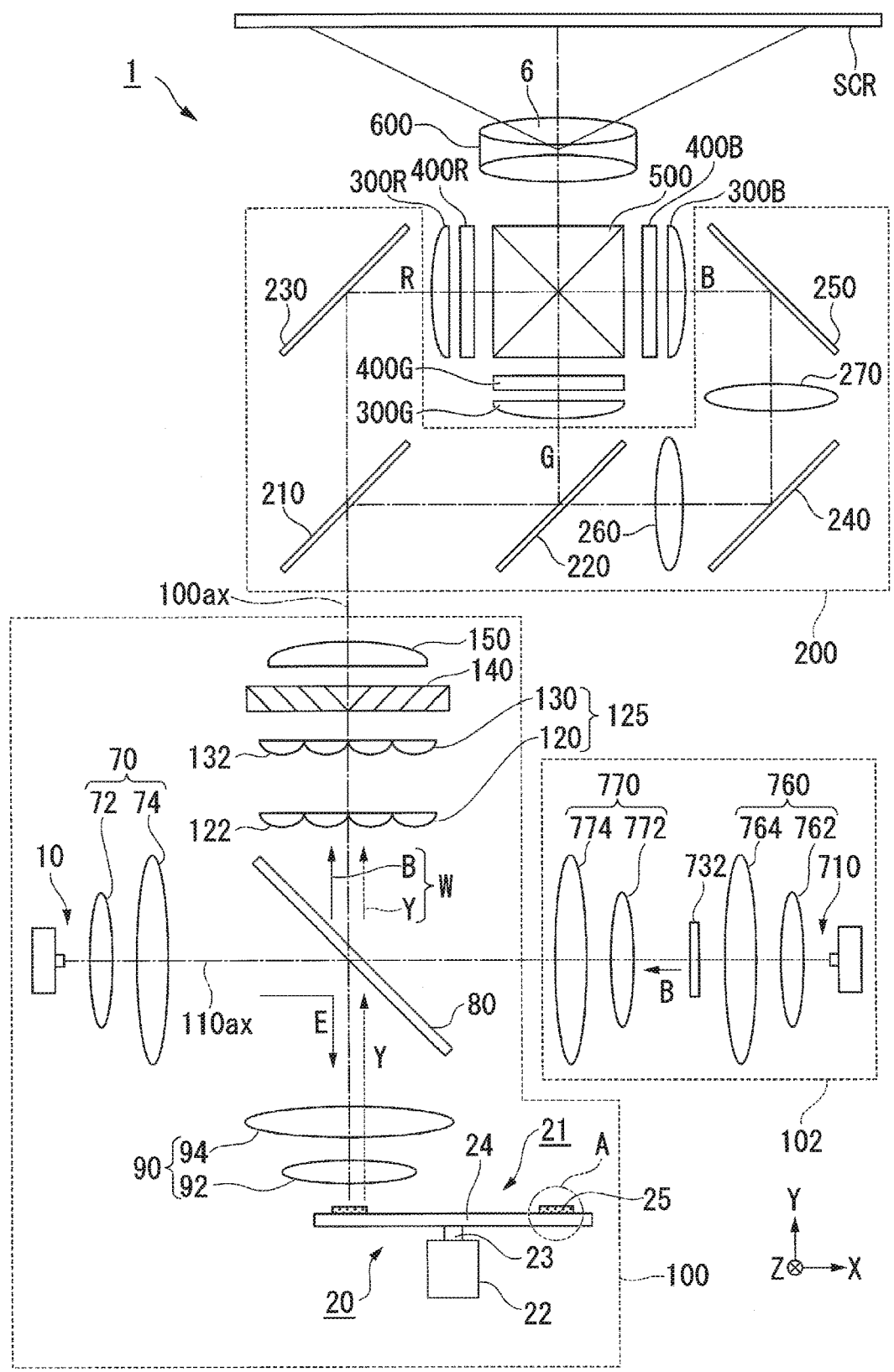
FIG. 1 is a schematic configuration diagram of a projector according to a first embodiment.

FIG. 1 is a schematic configuration diagram of the projector according to the present embodiment.

A projector 1 includes a first light source apparatus 100 (light source apparatus), a second light source apparatus 102, a light separation/light guide system 200, a light modulator 400R, a light modulator 400G, a light modulator 400B, a light combining system 500, and a projection system 600, as shown in FIG. 1.

The first light source apparatus 100 according to the present embodiment corresponds to the light source apparatus in the appended claims.

The light source apparatus 100 includes a first light emitting device 10, a collimation system 70, a dichroic mirror 80, a collimation/light collection system 90, a wavelength conversion apparatus 20, a homogenizer system 125, a polarization conversion element 140, and a superimposing lens 150. The wavelength conversion apparatus 20 will be described later in detail.

The first light emitting device 10 is formed of a semiconductor laser that emits blue excitation light E. The intensity of the emitted excitation light E peaks, for example, at a wavelength of 445 nm. The first light emitting device 10 may be formed of one semiconductor laser or a plurality of semiconductor lasers. The first light emitting device 10 may instead be formed of a semiconductor laser that emits blue light having a wavelength different from 445 nm (460 nm, for example). The first light emitting device 10 is so disposed that the optical axis $110ax$ thereof is perpendicular to an illumination optical axis $100ax$.

The first light emitting device 10 in the present embodiment corresponds to an excitation light source in the appended claims.

The collimation system 70 includes a first lens 72 and a second lens 74. The collimation system 70 roughly parallelizes the light emitted from the first light emitting device 10. The first lens 72 and the second lens 74 are each formed of a convex lens.

The dichroic mirror 80 is provided in the optical path from the collimation system 70 to the collimation/light collection system 90. The dichroic mirror 80 is so disposed as to incline by 45° with respect to the optical axis $110ax$ of the first light emitting device 10 and the illumination optical axis $100ax$. The dichroic mirror 80 reflects light that belongs to a blue wavelength region and transmits light that belongs to a yellow wavelength region containing red light and green light.

The collimation/light collection system 90 has the function of causing the excitation light E having exited out of the dichroic mirror 80 to be incident on a wavelength conversion element 21 with the excitation light E roughly focused and the function of roughly parallelizing fluorescence Y emitted from the wavelength conversion element 21. The collimation/light collection system 90 includes a first lens 92 and a second lens 94. The first lens 92 and the second lens 94 are each formed of a convex lens.

The second light source apparatus 102 includes a second light emitting device 710, a light collection system 760, a diffuser plate 732, and a collimation system 770.

The second light emitting device 710 is formed of a semiconductor laser that emits blue light B. The intensity of the emitted blue light B peaks, for example, at a wavelength of 460 nm, which is different from the wavelength at which the intensity of the excitation light E emitted from the first light emitting device 10 peaks. The second light emitting device 710 may instead be formed of a semiconductor laser that emits light having intensity that peaks at the same wavelength at which the intensity of the excitation light E emitted from the first light emitting device 10 peaks.

The light collection system 760 includes a first lens 762 and a second lens 764. The light collection system 760 collects the blue light B emitted from the second light emitting device 710 in the vicinity of the diffuser plate 732. The first lens 762 and the second lens 764 are each formed of a convex lens.

The diffuser plate 732 diffuses the blue light B emitted from the second light emitting device 710 into blue light B having a light orientation distribution similar to the light orientation distribution of the fluorescence Y emitted from the wavelength conversion apparatus 20. The diffuser plate 732 can, for example, be a ground glass plate made of optical glass.

The collimation system 770 includes a first lens 772 and a second lens 774. The collimation system 770 roughly parallelizes the light having exited out of the diffuser plate 732. The first lens 772 and the second lens 774 are each formed of a convex lens.

The blue light B outputted from the second light source apparatus 102 is reflected off the dichroic mirror 80 and then combined with the fluorescence Y having passed through the dichroic mirror 80 into white illumination light W. The illumination light W enters the homogenizer system 125.

The homogenizer system 125 includes a first lens array 120 and a second lens array 130. The first lens array 120 includes a plurality of first lenses 122 for dividing the light outputted having exited out of the dichroic mirror 80 into a plurality of sub-light fluxes. The plurality of first lenses 122 are arranged in a matrix in a plane perpendicular to the illumination optical axis 100*ax*.

The second lens array 130 includes a plurality of second lenses 132 corresponding to the plurality of first lenses 122 in the first lens array 120. The second lens array 130, along with the superimposing lens 150, forms images of the first lenses 122 in the first lens array 120 in the vicinity of an image formation area of each of the light modulators 400R, 400G, and 400B. The plurality of second lenses 132 are arranged in a matrix in a plane perpendicular to the illumination optical axis 100*ax*.

The polarization conversion element 140 converts each of the divided sub-light ray fluxes from the first lens array 120 into a linearly polarized light. The polarization conversion element 140 includes polarization separation layers, reflection layers, and retardation layers, although not shown in detail. The polarization separation layers directly transmit one linearly polarized light component of the polarized light components contained in the light from the wavelength conversion apparatus 20 and reflect another linearly polarized light component in the direction perpendicular to the illumination optical axis 100*ax*. The reflection layers reflect the other linearly polarized light component reflected off the polarization separation layers in the direction parallel to the illumination optical axis 100*ax*. The retardation layers convert the other linearly polarized light component reflected off the reflection layers into the one linearly polarized light component.

The superimposing lens 150 collects the sub-light ray fluxes from the polarization conversion element 140 and superimposes the sub-light ray fluxes on one another in the vicinity of the image formation area of each of the light modulators 400R, 400G, and 400B. The first lens array 120, the second lens array 130, and the superimposing lens 150 homogenize the in-plane optical intensity distribution of the light outputted from the wavelength conversion apparatus 20.

The color separation/light guide system 200 separates the white illumination light W into the red light L, the green light G, and the blue light B. The color separation/light guide system 200 includes a first dichroic mirror 210, a second dichroic mirror 220, a first reflection mirror 230, a second reflection mirror 240, a third reflection mirror 250, a first relay lens 260, and a second relay lens 270.

The first dichroic mirror 210 has the function of separating the illumination light W outputted from the first light source apparatus 100 into the red light and the other light (green light G and blue light B). The first dichroic mirror 210 transmits the red light R and reflects the other light (green light G and blue light B). On the other hand, the second dichroic mirror 220 has the function of separating the other light into the green light G and the blue light B. The second dichroic mirror 220 reflects the green light G and transmits the blue light B.

The first reflection mirror 230 is disposed in the optical path of the red light R and reflects the red light R having passed through the first dichroic mirror 210 toward the light modulator 400R. The second reflection mirror 240 and the third reflection mirror 250 are disposed in the optical path of the blue light B and reflect the blue light B having passed through the second dichroic mirror 220 toward the light modulator 400B. The green light G is reflected off the second dichroic mirror 220 toward the light modulator 400G.

The first relay lens 260 and the second relay lens 270 are disposed in the optical path of the blue light B and on the light exiting side of the second dichroic mirror 220. The first relay lens 260 and the second relay lens 270 have the function of compensating loss of the blue light B due to the fact that the optical path of the blue light B is longer than the optical paths of the red light R and the green light G.

The light modulator 400R modulates the red light R in accordance with image information to form image light corresponding to the red light R. The light modulator 400G modulates the green light G in accordance with image information to form image light corresponding to the green light G. The light modulator 400B modulates the blue light B in accordance with image information to form image light corresponding to the blue light B.

A transmissive liquid crystal panel is, for example, used as each of the light modulators 400R, 400G, and 400B. A pair of polarizers (not shown) are disposed on the light incident side and light exiting side of each of the liquid crystal panels and configured to transmit only light linearly polarized in a specific direction.

Field lenses 300R, 300G, and 300B are disposed on the light incident side of the light modulators 400R, 400G, and 400B, respectively. The field lenses 300R, 300G, and 300B parallelize the red light R, the green light G, and the blue light B to be incident on the light modulators 400R, 400G, and 400B, respectively.

The light combining system 500 combines the image light fluxes incident thereon from the light modulators 400R, 400G, and 400B with one another into image light corresponding to the red light R, the green light G, and the blue light B and causes the combined image light to exit toward the projection system 600. Across dichroic prism is, for example, used as the light combining system 500.

The projection system 600 is formed of a projection lens group 6. The projection system 600 enlarges the combined image light from the light combining system 500 and projects the enlarged image light toward a screen SCR. An enlarged color video (images) is thus displayed on the screen SCR.

The configuration of the wavelength conversion apparatus 20 will be described below.

Figure 2:
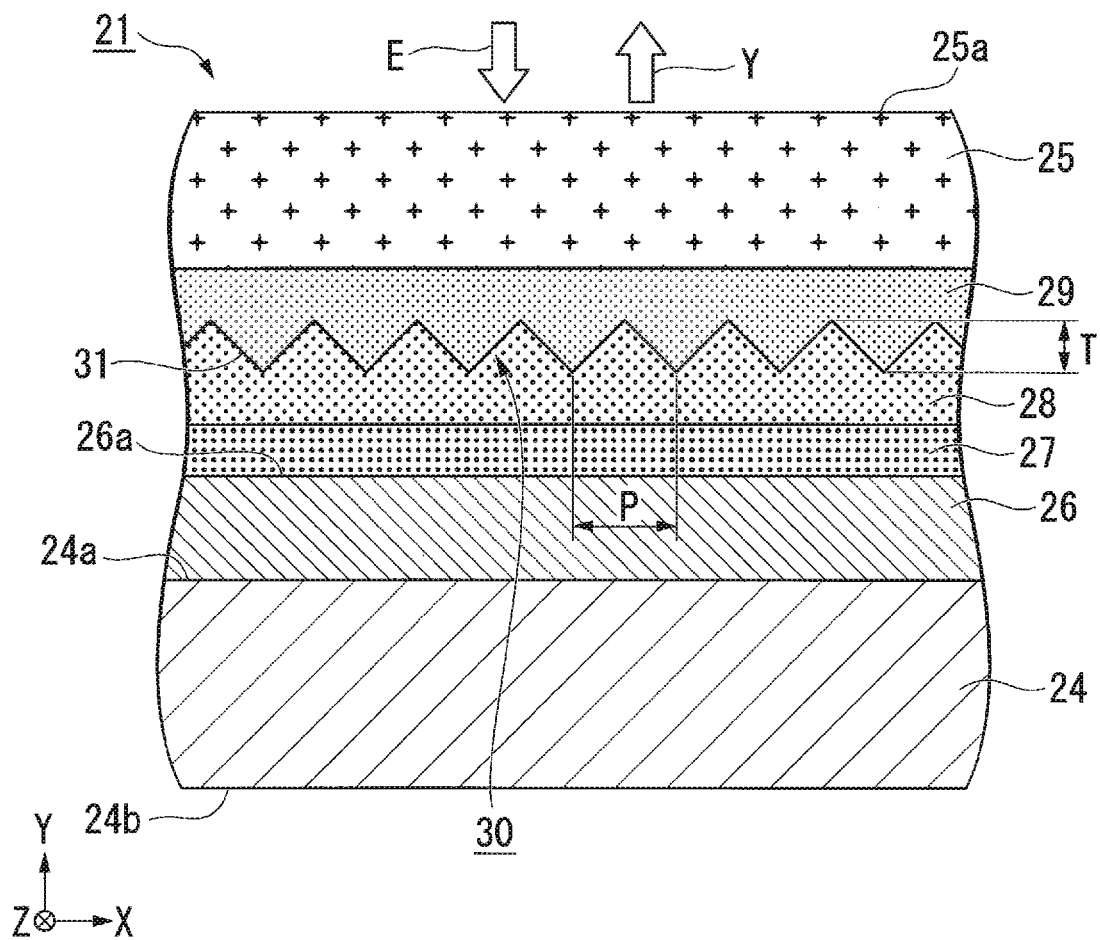
FIG. 2 is a cross-sectional view of a wavelength conversion element according to the first embodiment.

FIG. 2 is a cross-sectional view of the wavelength conversion element 21 and is an enlarged view of the portion labeled with the reference character A in FIG. 1.

Figure 6:
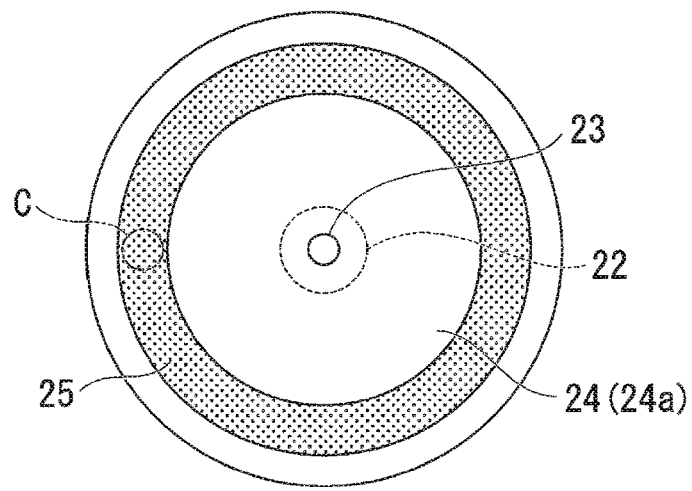
FIG. 6 is a plan view of a wavelength conversion apparatus viewed in the direction of a normal to a substrate.

FIG. 6 is a plan view of the wavelength conversion apparatus 20 viewed in the direction of a normal to a substrate 24.

The wavelength conversion apparatus 20 includes the wavelength conversion element 21, which has a disk-like shape, and a motor 22, which rotates the wavelength conversion element 21, as shown in FIGS. 2 and 6. The configuration of the wavelength conversion element 21 will be described later in detail. In FIG. 1, the components of the wavelength conversion element 21 are omitted as appropriate for ease of illustration.

The wavelength conversion element 21 rotates around a rotary shaft 23 when driven with the motor 22. The substrate 24 has a circular shape when viewed in the direction in which the rotary shaft 23 extends. A phosphor layer 25 is provided on a first surface 24*a* of the substrate 24 in the form of a ring along the circumferential direction of the substrate 24. One location of the ring-shaped phosphor layer 25 is irradiated with the excitation light E. In FIG. 6, the area irradiated with the excitation light E is labeled with the reference character C.

The wavelength conversion element 21 includes the substrate 24, a reflection mirror 26 (reflection section), a bonding layer 27 (bonding section), a low refractive index layer 28 (first refractive index section), a high refractive index layer 29 (second refractive index section), the phosphor layer 25 (wavelength conversion section), and a refractive index interface 31 provided with a plurality of prism structures 30, as shown in FIG. 2. The reflection mirror 26, the bonding layer 27, the low refractive index layer 28, the high refractive index layer 29, and the phosphor layer 25 are layered on the first surface 24a (upper surface) of the substrate 24 in this order from the side facing the substrate 24. That is, the wavelength conversion element 21 further includes the low refractive index layer 28, which is so provided between the phosphor layer 25 and the bonding layer 27 as to be in contact with the bonding layer 27, and the high refractive index layer 29, which is so provided between the phosphor layer 25 and the bonding layer 27 as to be in contact with the phosphor layer 25.

The phosphor layer 25 has a first surface 25a (upper surface), on which the excitation light E is incident and through which the fluorescence Y exits. That is, the wavelength conversion element 21 is a reflective wavelength conversion element that emits the fluorescence Y through the surface on which the excitation light E is incident.

The substrate 24 is formed of a metal plate made, for example, of copper or aluminum, which has relatively high thermal conductivity. The substrate 24 has the function of supporting the reflection mirror 26, the bonding layer 27, the low refractive index layer 28, the high refractive index layer 29, and the phosphor layer 25 and dissipating heat generated in the phosphor layer 25. To enhance the heat dissipating function, a heat sink or any other heat dissipating member may be provided on a second surface 24b of the substrate 24.

The reflection mirror 26 is configured in the form of a dielectric mirror formed of a dielectric multilayer film. The reflection mirror 26 may instead be configured in the form of a metal mirror formed of a metal thin film made, for example, of silver. The reflection mirror 26 may be formed as a component separate from the substrate 24 and glued to the first surface 24a of the substrate 24 via an adhesive layer that is not shown or may have a configuration in which a dielectric multilayer film or a metal thin film is directly formed on the first surface 24a of the substrate 24. The reflection mirror 26 reflects the fluorescence Y traveling toward the substrate 24 out of the fluorescence Y emitted from the phosphor layer 25 to cause the reflected fluorescence Y to travel toward the phosphor layer 25 again. The upper surface of the reflection mirror 26 is therefore a reflection surface 26a. The reflection surface 26a of the reflection mirror 26 reflects the fluorescence Y. That is, the wavelength conversion element 21 includes the substrate 24 so provided as to be in contact with the reflection mirror 26.

The bonding layer 27 is made of a silicone adhesive having light transparency. The bonding layer 27 bonds the substrate 24, on which the reflection mirror 26 is provided, to a separately produced laminate formed of the low refractive index layer 28, the high refractive index layer 29, and the phosphor layer 25. That is, the bonding layer 27 bonds the phosphor layer 25 and the reflection mirror 26 to each other.

The low refractive index layer 28 and the high refractive index layer 29 are each made of glass, resin, or any other material having light transparency. The high refractive index layer 29 is made of a first medium. The low refractive index layer 28 is made of a second medium different from the first medium in terms of medium type. That is, the surface where the low refractive index layer 28 and the high refractive index layer 29 are in contact with each other forms the refractive index interface 31, where the first medium and the second medium, which have refractive indices different from each other, are in contact with each other. The refractive index interface 31 is formed of a surface which is provided between the first surface 25a and the reflection surface 26a and where the first medium and the second medium, which have refractive indices different from each other, are in contact with each other. The refractive index of the first medium, which is located on one side of the refractive index interface 31, the side facing the first surface 25a, is higher than the refractive index of the second medium, which is located on the other side of the refractive index interface 31, the side facing the reflection surface 26a.

Figure 3A:
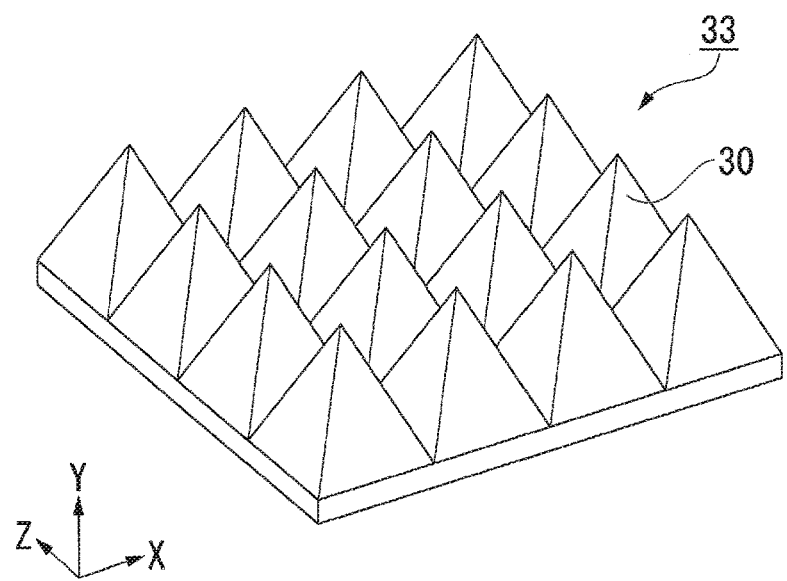
FIG. 3A is a perspective view of a plurality of prism structures.
Figure 3B:
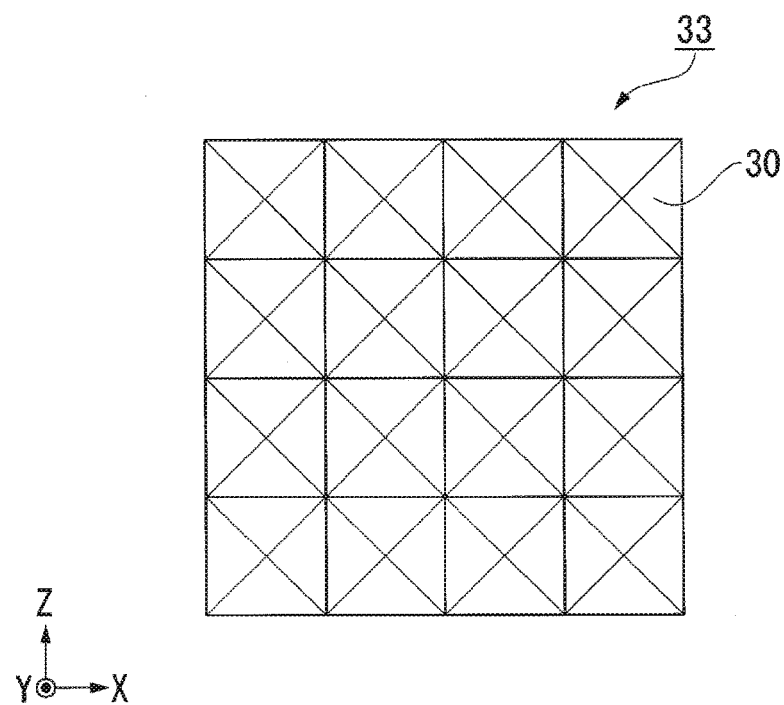
FIG. 3B is a plan view of the plurality of prism structures viewed in the direction of a normal to a reflection surface.

FIG. 3A is a perspective view of the plurality of prism structures 30. FIG. 3B is a plan view of the plurality of prism structures 30 viewed in the direction of a normal to the reflection surface 26a.

A prism array 33 formed of the plurality of prism structures 30 is provided along the refractive index interface 31 between the low refractive index layer 28 and the high refractive index layer 29, as shown in FIGS. 2, 3A, and 3B. The prism array 33 has a configuration in which the plurality of prism structures 30 are arranged with no gap therebetween in a closest packing state. In other words, the refractive index interface 31 is so shaped that a plurality of inclining surfaces are continuously arranged with no gap therebetween. The prism structures 30 are each a square pyramid having a square bottom surface in the description byway of example but may be a quadrilateral pyramid other than a square pyramid or a polygonal pyramid other than a quadrilateral pyramid. That is, the refractive index interface 31 is so shaped to contain a plurality of pyramids. In this case, the pyramids each have a polygonal bottom surface.

The plurality of prism structures 30 may have the same dimension and shape or may have different dimensions and shapes. In the case where the plurality of prism structures 30 may have the same dimension and shape, the prism structures 30 are desirably arranged at intervals P ranging, for example, from about several micrometers to 50 micrometers. The prism structures 30 desirably have a height T (distance from bottom surface to vertex) that is desirably, for example, at least 0.2 times the arrangement interval P described above.

Figure 4A:
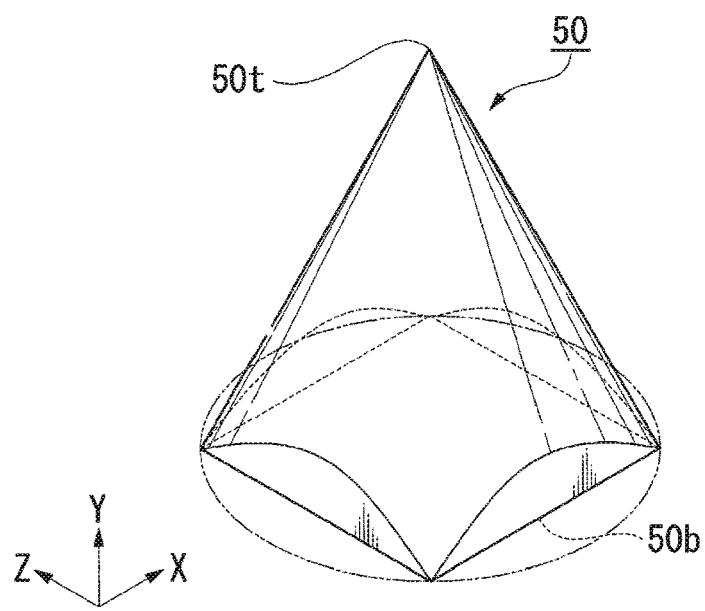
FIG. 4A is a perspective view of a prism structure in a variation.
Figure 4B:
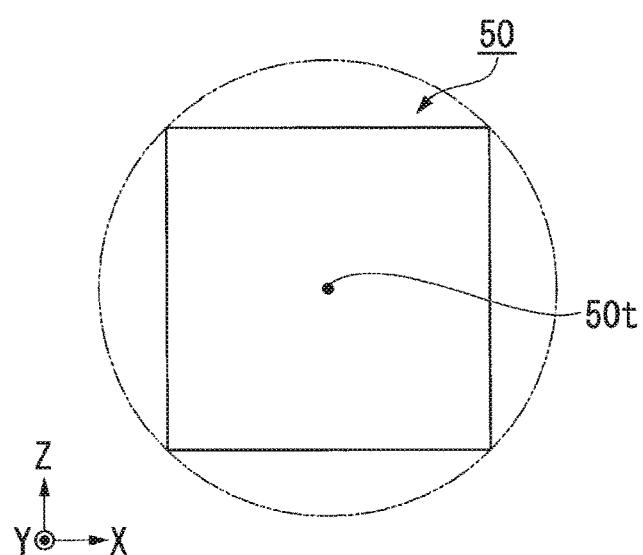
FIG. 4B is a plan view of the prism structure in the variation viewed in the direction of a normal to the reflection surface.

FIG. 4A is a perspective view of a prism structure 50 in a variation. FIG. 4B is a plan view of the prism structures 50 in the variation viewed in the direction of a normal to the reflection surface 26a.

The prism structure 50 in the variation is a cone as the basis shape but is also so shaped that part of a bottom-side portion of the cone is cut along flat planes parallel to the center axis of the cone, as shown in FIGS. 4A and 4B. That is, the prism structure 50 is so shaped that a portion thereof facing the vertex 50t has a conical shape and a portion thereof facing the bottom surface 50b has a square shape. The bottom surface 50b of the prism structure 50 may instead be a quadrilateral other than a square or a polygon other than a quadrilateral.

The prism array 33 may be provided along the high refractive index layer 29 or the low refractive index layer 28. In the case where the prism array is provided along the high refractive index layer 29, the prism array 33 can be produced in the step of manufacturing the wavelength conversion element 21 as follows: A die is used to form the high refractive index layer 29; the surface shape of the die is transferred to the surface of a high refractive index layer material to form the plurality of prism structures 30; and the gaps between the prism structures 30 are filled with a low refractive index layer material. The same holds true for the case where the prism array 33 is provided along the low refractive index layer 28.

The phosphor layer 25 is formed of a phosphor that is excited with the excitation light E emitted from the first light emitting device 10 and emits the yellow fluorescence Y. The phosphor layer 25 contains a YAG-based phosphor made of $(Y,GD)_3(Al,Ga)_5O_{12}(YAG:Ce)$, which is an inorganic material, and an activator agent that is dispersed in the YAG phosphor and serves as light emission centers. That is, in the first embodiment, the phosphor layer 25 is formed of a YAG-based phosphor made of $(Y,GD)_3(Al,Ga)_5O_{12}(YAG:Ce)$ having Ce dispersed therein as the activator agent.

The phosphor layer 25 is not necessarily formed of a YAG-based phosphor but is desirably formed of a garnet-based phosphor. A garnet-based phosphor has thermal conductivity higher than that of any other phosphor and has therefore higher reliability in a high temperature environment. Therefore, even in a case where the light source apparatus uses a stationary phosphor is used in place of the rotating wheel, high-intensity fluorescence is produced.

As an example of the refractive index, assume that the refractive index of the phosphor layer 25 made of a YAG-based phosphor is 1.8, and that the refractive index of the bonding layer 27 made of a silicone adhesive is 1.4. The materials of the low refractive index layer 28 and the high refractive index layer 29 may be so selected from glass, resin, and other materials each having a refractive index greater than 1.4 but smaller than 1.8 that the refractive index of the low refractive index layer 28 is smaller than the refractive index of the high refractive index layer 29.

The operation of the wavelength conversion element 21 according to the present embodiment will be described below with reference to FIG. 5.

Figure 5:
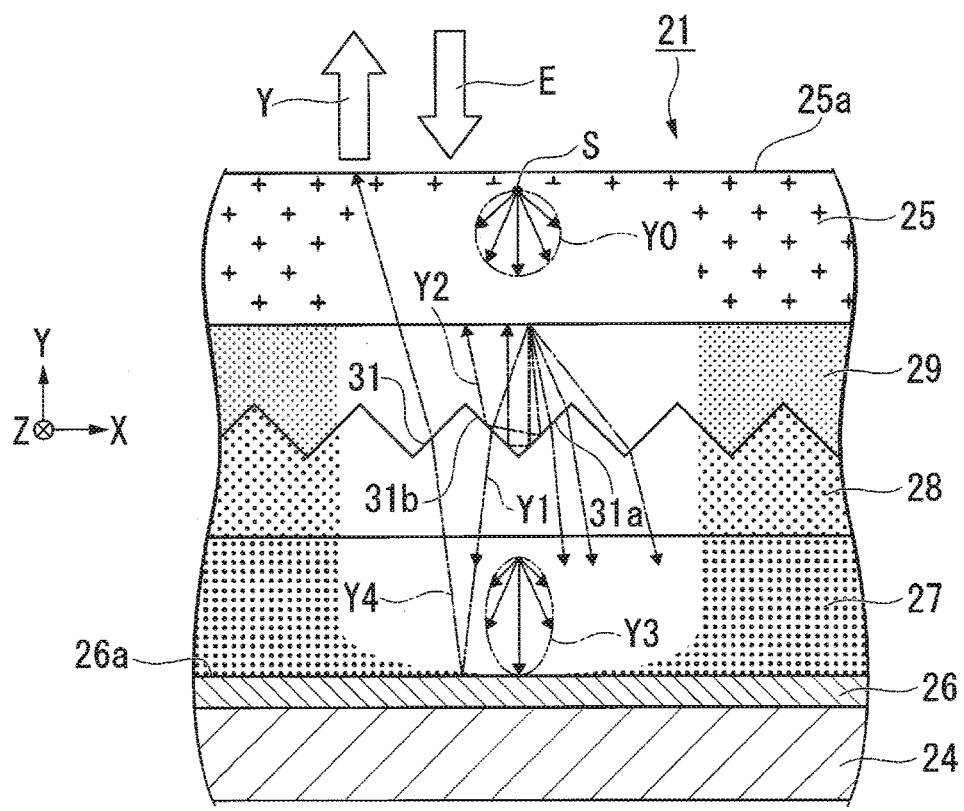
FIG. 5 describes the operation of the wavelength conversion element.

The fluorescence Y produced when the phosphor layer 25 is irradiated with the excitation light E has no directivity and therefore isotropically travels, as shown in FIG. 5. That is, the light orientation distribution of the fluorescence Y is the Lambertian distribution.

There is fluorescence Y that travels from an arbitrary light emission point S in the phosphor layer 25 toward the first surface 25a (upper side in FIG. 5) and directly exits into the external space, but fluorescence Y0, which travels from the light emission point S toward the refractive index interface 31 (lower side in FIG. 5) is now considered. Having traveled through the high refractive index layer 29 and reached the refractive index interface 31, the fluorescence Y0 is separated in accordance with the angle of incidence thereof with respect to the refractive index interface 31 into transmitted light Y1, which passes through the refractive index interface 31, and reflected light Y2, which is totally reflected off the refractive index interface 31.

The transmitted light Y1 is refracted at the refractive index interface 31 in a direction in which the refracted light Y1 is incident on the reflection surface 26a at a smaller angle of incidence. On the other hand, the reflected light Y2 is reflected again off the portion of the refractive index interface 31 (inclining surface 31b) adjacent to the portion of the refractive index interface 31 (inclining surface 31a) on which the fluorescence Y0 has been incident for the first time, returns into the phosphor layer 25, is scatteringly reflected off fine particles and air holes in the phosphor layer 25, and is incident again on the refractive index interface 31. To be exact, the entire reflected light Y2 is not reflected again off the reflection surfaces 31b, and part of the reflected light which is totally reflected off the refractive index interface 31 (not shown) passes through the inclining surface 31b. The light having passed through the inclining surface 31b causes the light orientation distribution to widen, but the amount of such light is limited. Further, the prism structures 30 and 50 are desirably so designed as to minimize the amount of such light.

As described above, the majority of the fluorescence Y0 emitted from the phosphor layer 25 toward the reflection surface 26a passes through the refractive index interface 31 and impinges on the reflection mirror 26. In this process, there is light that repeatedly undergoes multiple reflection between the phosphor layer 25 and the refractive index interface 31 and eventually impinges on the reflection mirror 26, as described above. The passage of the fluorescence Y0 emitted toward the reflection mirror 26 through the refractive index interface 31 from the high refractive index medium (first medium) toward the low refractive index medium (second medium) increases the directivity of the fluorescence Y0, so that the fluorescence Y0 is converted into fluorescence Y3 having a narrower light orientation distribution, which is incident on the reflection mirror 26. That is, the angular distribution of the fluorescence Y3 having passed through the refractive index interface 31 is narrower than the angular distribution of the fluorescence Y0 before passing through the refractive index interface 31.

The fluorescence Y3 having the narrower angular distribution is reflected off the reflection mirror 26 and therefore returns into the phosphor layer, and fluorescence Y4 reflected off the reflection surface exits in the direction opposite the direction in which the excitation light E has been incident through the first surface 25a of the phosphor layer 25.

In both the case where the reflection mirror 26 is formed of a dielectric mirror and the case where the reflection mirror 26 is formed of a metal mirror, the reflectance of the fluorescence depends on the angle of incidence thereof, and the greater the angle of incidence, the lower the reflectance. A light source apparatus of related art therefore has a problem of a wide angular distribution of the fluorescence incident on the reflection mirror and hence a decrease in the amount of reflected light.

To solve the problem described above, in the wavelength conversion element 21 according to the present embodiment, which is provided with the refractive index interface 31 including the prism array 33, the angular distribution of the fluorescence Y incident on the reflection mirror 26 is narrower than in a case where no refractive index interface 31 is provided, whereby high reflectance of the fluorescence Y is achieved, and a decrease in the amount of reflected light can be suppressed. A wavelength conversion element 21 capable of producing high-optical-intensity fluorescence Y can thus be achieved.

Further, a dielectric mirror has a high dependence of the reflectance on the angle of incidence as compared with a metal mirror but allows high reflectance as compared with a metal mirror in a region of a narrow incident angle range and hence achieves low reflection loss. A dielectric mirror is therefore preferably used in combination with the refractive index interface 31 provided with the prism array 33, whereby the efficiency of reflection of the fluorescence Y can be increased by making use of the characteristics of a dielectric multilayer film. Further, since the amount of light absorbed by a dielectric mirror is smaller than the amount of light absorbed by a metal mirror, even when high-optical-intensity excitation light E is incident on the dielectric mirror, degradation of the reflection mirror 26 can be suppressed, whereby stable optical performance of the reflection mirror 26 can be maintained for a long period.

Further, since the wavelength conversion element 21 according to the present embodiment includes the high refractive index layer 29 and the low refractive index layer 28, appropriately selecting the materials of the layers to adjust the refractive indices of the high refractive index layer 29 and the low refractive index layer 28 allows control of the angular distribution of the fluorescence Y having passed through the refractive index interface 31.

Since the wavelength conversion element 21 according to the present embodiment includes a square pyramidal prism structures 30, a symmetric angular distribution with respect to the direction of a normal to the reflection surface 26a can be produced. Further, since the plurality of prism structures 30 can be arranged in the closest packing state, as shown in FIG. 3B, the effect of narrowing the angular distribution of the fluorescence Y can be maximized.

The first light source apparatus 100 according to the present embodiment, which includes the wavelength conversion element 21 having the effect described above, can produce high-optical-intensity fluorescence and can therefore produce high-intensity output light.

The projector 1 according to the present embodiment, which includes the first light source apparatus 100 having the effect described above, can produce a high-luminance projection image.

Second Embodiment

A second embodiment of the invention will be described below with reference to FIG. 7.

A projector and a light source apparatus according to the second embodiment are the same as those according to the first embodiment in terms of basic configuration but differ therefrom in terms of the configuration of the wavelength conversion element. No overall description of the projector and the light source apparatus is therefore made, and only the wavelength conversion element will be described.

Figure 7:
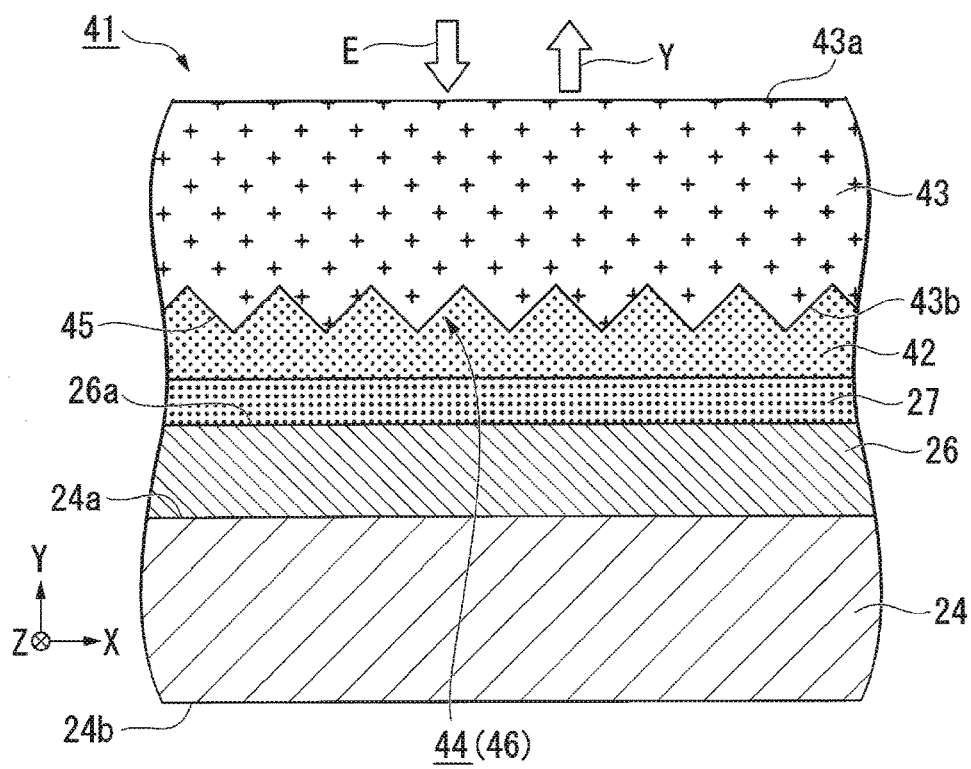
FIG. 7 is a cross-sectional view of a wavelength conversion element according to a second embodiment.

FIG. 7 is a cross-sectional view of the wavelength conversion element according to the second embodiment.

In FIG. 7, components common to those in the drawings used in the first embodiment have the same reference characters, and no detailed description of the common components will be made.

A wavelength conversion element 41 includes the substrate 24, the reflection mirror 26 (reflection section), the bonding layer 27 (bonding section), a low refractive index layer 42 (first refractive index section), a phosphor layer 43 (wavelength conversion section), and a refractive index interface 45 provided with a plurality of prism structures 44, as shown in FIG. 7. The reflection mirror 26, the bonding layer 27, the low refractive index layer 42, and the phosphor layer 43 are layered on the first surface 24a of the substrate 24 in this order from the side facing the substrate 24. That is, the wavelength conversion element 41 further includes the low refractive index layer 42 provided between the phosphor layer 43 and the bonding layer 27.

The low refractive index layer 42 is made of glass, resin, or any other material having light transparency. The low refractive index layer 42 is made of the second medium different from the medium of the phosphor layer 43 (first medium) in terms of refractive index. That is, the surface where the phosphor layer 43 and the low refractive index layer 42 are in contact with each other forms the refractive index interface 45, where the first medium and the second medium, which have refractive indices different from each other, are in contact with each other. The refractive index of the first medium, which forms the phosphor layer 43 located on one side of the refractive index interface 45, the side facing a first surface 43a, is higher than the refractive index of the second medium, which forms the low refractive index layer 42 located on the other side of the refractive index interface 45, the side facing the reflection surface 26a. The phosphor layer 43 in the second embodiment therefore operates as both the phosphor layer 25 and the high refractive index layer 29 in the first embodiment.

A prism array 46 formed of the plurality of prism structures 44 is provided along the refractive index interface 45 between the phosphor layer 43 and the low refractive index layer 42. The prism structures 44 and the prism array 46 are configured in the same manner as in the first embodiment. The prism array 46 may be provided on the phosphor layer 43 or the low refractive index layer 42. In the case where the prism array 46 is provided on the phosphor layer 43, the prism array 46 can be produced in the step of manufacturing the wavelength conversion element 41, for example, by etching a second surface 43b of the phosphor layer 43.

The other configurations of the prism array 46 are the same as those in the first embodiment.

In the wavelength conversion element 41 according to the second embodiment, since the refractive index interface 45 including the prism array 46 is provided, and the first medium, which forms the base material of the phosphor layer 43, has a refractive index higher than that of the second medium, which forms the low refractive index layer 42, the angular distribution of the fluorescence Y incident on the reflection mirror 26 can be narrowed, whereby high reflectance is achieved at the reflection mirror 26, and a decrease in the amount of reflected light can therefore be suppressed, as in the first embodiment. A wavelength conversion element 41 capable of producing high-optical-intensity fluorescence Y can thus be achieved.

Further, also in the second embodiment, use of a dielectric mirror advantageously allows suppression of degradation of the reflection mirror 26, as in the first embodiment.

In the second embodiment, in which no high refractive index layer 29 is used, unlike in the first embodiment, the number of layers that form the wavelength conversion element 41 can be reduced, as compared with the first embodiment. The cost of the wavelength conversion element 41 can therefore be reduced.

Third Embodiment

A third embodiment of the invention will be described below with reference to FIG. 8.

A projector and a light source apparatus according to the third embodiment are the same as those according to the first embodiment in terms of basic configuration but differ therefrom in terms of the configuration of the wavelength conversion element. No overall description of the projector and the light source apparatus is therefore made, and only the wavelength conversion element will be described.

Figure 8:
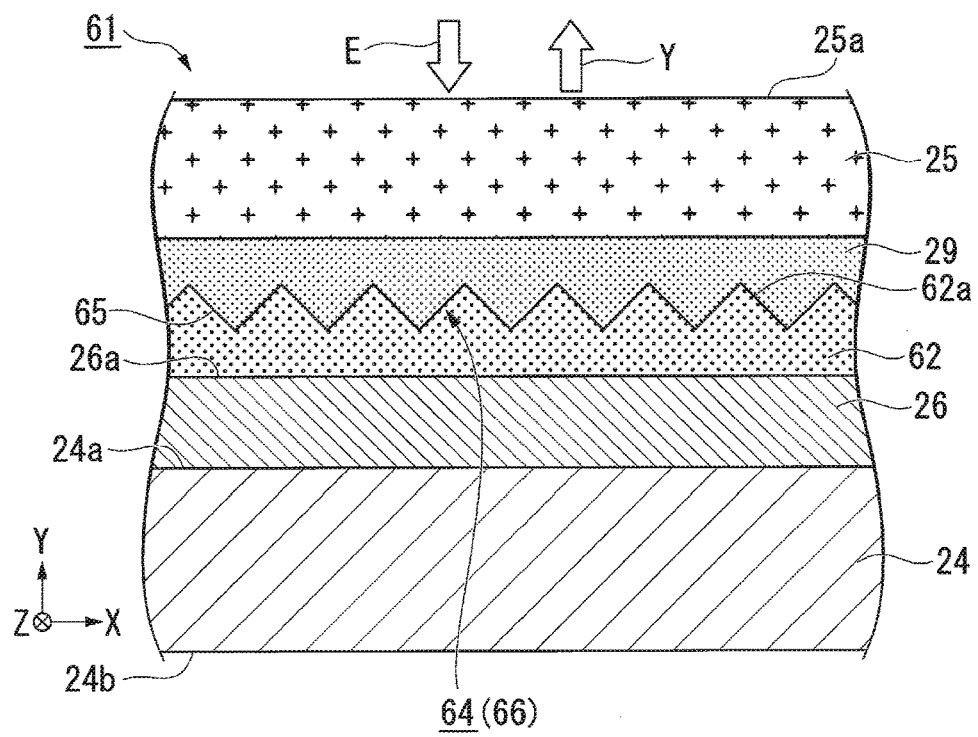
FIG. 8 is a cross-sectional view of a wavelength conversion element according to a third embodiment.

FIG. 8 is a cross-sectional view of the wavelength conversion element according to the third embodiment.

In FIG. 8, components common to those in the drawings used in the first embodiment have the same reference characters, and no detailed description of the common components will be made.

A wavelength conversion element 61 includes the substrate 24, the reflection mirror 26 (reflection section), a bonding layer 62 (bonding section), the high refractive index layer 29 (second refractive index section), the phosphor layer 25 (wavelength conversion section), and a refractive index interface 65 provided with a plurality of prism structures 64, as shown in FIG. 8. The reflection mirror 26, the bonding layer 62, the high refractive index layer 29, and the phosphor layer 25 are layered on the first surface 24a of the substrate 24 in this order from the side facing the substrate 24. That is, the wavelength conversion element 61 further includes the high refractive index layer 29 provided between the phosphor layer 25 and the bonding layer 62.

The high refractive index layer 29 is made of glass, resin, or any other material having light transparency. The high refractive index layer 29 is made of the first medium different from the second medium, which forms the bonding layer 62, in terms of refractive index. That is, the surface where the high refractive index layer 29 and the bonding layer 62 are in contact with each other forms the refractive index interface 65, where the first medium and the second medium, which have refractive indices different from each other, are in contact with each other. The refractive index of the first medium, which forms the high refractive index layer 29 located on one side of the refractive index interface 65, the side facing the first surface 25a, is higher than the refractive index of the second medium, which forms the bonding layer 62 located on the other side of the refractive index interface 65, the side facing the reflection surface 26a. The bonding layer 62 in the third embodiment therefore operates as both the low refractive index layer 28 and the bonding layer 27 in the first embodiment. The refractive index interface 65 may instead be formed of a first surface 62a of the bonding layer 62, the surface thereof located on the side facing the phosphor layer 25.

A prism array 66 formed of the plurality of prism structures 64 is provided along the refractive index interface 65 between the high refractive index layer 29 and the bonding layer 62. The prism structures 64 and the prism array 66 are configured in the same manner as in the first embodiment. The prism array 66 may be provided on the high refractive index layer 29 or the bonding layer 62.

The other configurations of the prism array 66 are the same as those in the first embodiment.

In the wavelength conversion element 61 according to the third embodiment, since the refractive index interface 65 provided with the prism array 66 is provided, and the first medium, which forms the high refractive index layer 29, has a refractive index higher than that of the second medium, which forms the bonding layer 62, the angular distribution of the fluorescence Y incident on the reflection mirror 26 can be narrowed, whereby high reflectance is achieved at the reflection mirror 26, and a decrease in the amount of reflected light can therefore be suppressed, as in the first embodiment. A wavelength conversion element 61 capable of producing high-optical-intensity fluorescence Y can thus be achieved.

Also in the third embodiment, use of a dielectric mirror advantageously allows suppression of degradation of the reflection mirror 26, as in the first embodiment.

In the third embodiment, in which no low refractive index layer 28 is used, unlike in the first embodiment, the number of layers that form the wavelength conversion element 61 can be reduced, as compared with the first embodiment. The cost of the wavelength conversion element 61 can therefore be reduced.

Fourth Embodiment

A fourth embodiment of the invention will be described below with reference to FIG. 9.

A projector and a light source apparatus according to the fourth embodiment are the same as those according to the first embodiment in terms of basic configuration but differ therefrom in terms of the configuration of the wavelength conversion element. No overall description of the projector and the light source apparatus is therefore made, and only the wavelength conversion element will be described.

Figure 9:
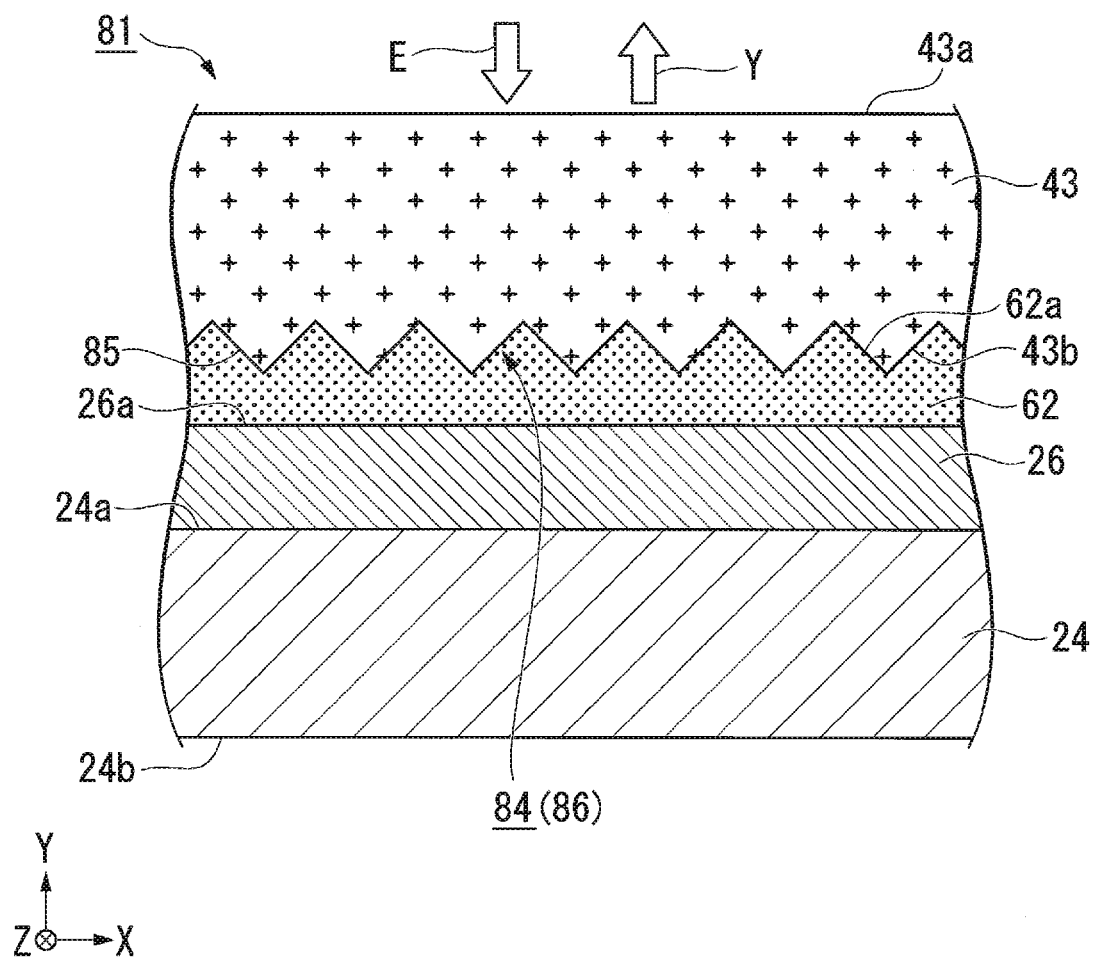
FIG. 9 is a cross-sectional view of a wavelength conversion element according to a fourth embodiment.

FIG. 9 is a cross-sectional view of the wavelength conversion element according to the fourth embodiment.

In FIG. 9, components common to those in the drawings used in the first to third embodiments have the same reference characters, and no detailed description of the common components will be made.

A wavelength conversion element 81 includes the substrate 24, the reflection mirror 26 (reflection section), the bonding layer 62 (bonding section), the phosphor layer 43 (wavelength conversion section), and a refractive index interface 85 provided with a plurality of prism structures 84, as shown in FIG. 9. The reflection mirror 26, the bonding layer 62, and the phosphor layer 43 are layered on the first surface 24a of the substrate 24 in this order from the side facing the substrate 24.

The surface where the phosphor layer 43 and the bonding layer 62 are in contact with each other forms the refractive index interface 85, where the first medium and the second medium, which have refractive indices different from each other, are in contact with each other. In other words, the refractive index interface 85 is formed of the second surface 43b of the phosphor layer 43, the surface thereof opposite the first surface 43a, or the first surface 62a of the bonding layer 62, the surface thereof facing the phosphor layer 43. The refractive index of the phosphor layer 43 (first medium) located on one side of the refractive index interface 85, the side facing the first surface 43a, is higher than the refractive index of the second medium, which forms the bonding layer 62 located on the other side of the refractive index interface 85, the side facing the reflection surface 26a.

A prism array 86 formed of the plurality of prism structures 84 is provided along the refractive index interface 85 between the phosphor layer 43 and the bonding layer 62. The prism array 86 is configured in the same manner as in the first embodiment. The prism array 86 maybe provided on the phosphor layer 43 or the bonding layer 62.

The other configurations of the prism array 86 are the same as those in the first embodiment.

In the wavelength conversion element 81 according to the fourth embodiment, since the refractive index interface 85 including the prism array 86 is provided, and the base material (first medium), which forms the phosphor layer 43, has a refractive index higher than that of the second medium, which forms the bonding layer 62, the angular distribution of the fluorescence Y incident on the reflection mirror 26 can be narrowed, whereby high reflectance is achieved at the reflection mirror 26, and a decrease in the amount of reflected light can therefore be suppressed, as in the first embodiment. A wavelength conversion element 81 capable of producing high-optical-intensity fluorescence Y can thus be achieved.

Also in the fourth embodiment, use of a dielectric mirror advantageously allows suppression of degradation of the reflection mirror 26, as in the first embodiment.

Further, in the fourth embodiment, in which no high refractive index layer 29 or low refractive index layer 28 is used, unlike in the first embodiment, the number of layers that form the wavelength conversion element 81 can be further educed, as compared with the second and third embodiments. The cost of the wavelength conversion element 81 can therefore be reduced.

Fifth Embodiment

A fifth embodiment of the invention will be described below with reference to FIG. 10.

A projector and a light source apparatus according to the fifth embodiment are the same as those according to the first embodiment in terms of basic configuration but differ therefrom in that the configuration of the wavelength conversion apparatus differs from the configuration of the wavelength conversion apparatus 20 in the first embodiment. No overall description of the projector and the light source apparatus is therefore made, and only the wavelength conversion apparatus will be described.

Figure 10:
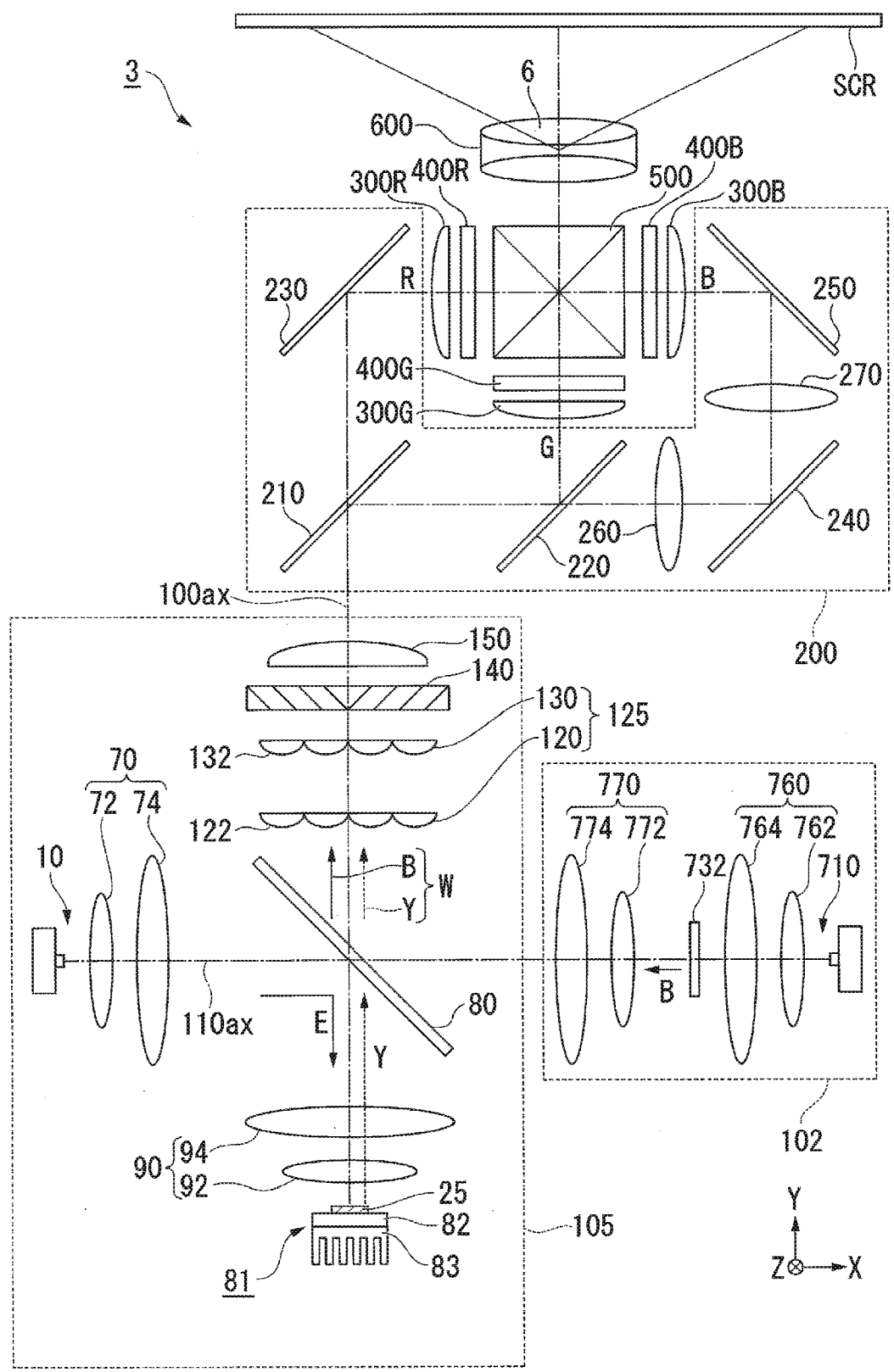
FIG. 10 is a schematic configuration diagram of a projector according to a fifth embodiment.

FIG. 10 is a schematic configuration diagram of the projector according to the fifth embodiment.

In FIG. 10, components common to those in the drawings used in the first embodiment have the same reference characters, and no detailed description of the common components will be made.

The wavelength conversion apparatus 20 of the first light source apparatus 100 according to the first embodiment includes a disk-shaped wavelength conversion element 21 rotatable with the motor 22. In contrast, in a projector 3 according to the fifth embodiment, a first light source apparatus 105 includes a stationary wavelength conversion element 81 (wavelength conversion apparatus 81), as shown in FIG. 10. The wavelength conversion element 81 has, for example, a rectangular shape when viewed in the direction of a normal to a substrate 82. The wavelength conversion element 81 can be a wavelength conversion element having the same cross-sectional structure as any of those of the wavelength conversion elements 21, 41, 61, and 81 shown in the first to fourth embodiments by way of example. It is, however, noted that a heat sink 83 may be provided on the substrate 82 to enhance the heat dissipation effect.

The fifth embodiment also provides the same advantageous effects as those provided by the first embodiment as follows: The wavelength conversion element 81 capable of producing high-optical-intensity fluorescence can be achieved; use of a dielectric mirror suppresses degradation of the reflection mirror; the first light source apparatus 100 capable of producing high-intensity output light can be achieved; and a projector 3 capable of producing a high-luminance projection image can be achieved.

The technical scope of the invention is not limited to the embodiments described above, and a variety of changes can be made thereto to the extent that the changes do not depart from the substance of the invention.

For example, in the embodiments described above, the case where a plurality of prism structures all having the same shape and dimension are provided on the refractive index interface has been presented by way of example. In place of this configuration, a plurality of pyramidal prism structures having different shapes or dimensions maybe provided. In this case, there is a case where the plurality of prism structures cannot be arranged in the closest packing state, and the refractive index interface therefore has a flat surface portion parallel to the reflection surface. In this configuration, the effect of narrowing the angular distribution of the fluorescence decreases as compared with the configuration in each of the embodiments described above. However, high-intensity fluorescence can be produced as compared with a wavelength conversion element of related art.

A layer other than the layers presented by way of example in the embodiments described above maybe added to the wavelength conversion element according to each of the embodiments of the invention. For example, an antireflection layer may be provided on the excitation-light-incident-side first surface of the phosphor layer.

In addition, the number, shape, material, arrangement, and other factors of each of the components that form the wavelength conversion element and the light source apparatus can be changed as appropriate. In the embodiments described above, the projector including the three light modulators is presented by way of example. Instead, the invention is also applicable to a projector that displays color video images via a single light modulator. Further, as each of the light modulators, the liquid crystal panel described above is not necessarily used, and a digital mirror device can, for example, be used.

The shape, number, arrangement, material, and other factors of each of the components of the projector are not limited to those in the embodiments described above and can be changed as appropriate.

Further, in the embodiments described above, the case where the light source apparatus according to any of the embodiments of the invention is incorporated in a projector is presented, but not necessarily. The light source apparatus according to any of the embodiments of the invention can also be used, for example, as a lighting apparatus and an automobile headlight.

The entire disclosure of Japanese Patent Application No. 2017-063251, filed on Mar. 28, 2017 is expressly incorporated by reference herein.

What is claimed is:

1. A wavelength conversion element comprising:
   a wavelength conversion section having a first surface on which excitation light is incident and through which fluorescence exits;
   a reflection section having a reflection surface that reflects the fluorescence;
   a light-transparent bonding section that bonds the wavelength conversion section to the reflection section; and
   a refractive index interface which is provided between the first surface and the reflection surface and where a first medium and a second medium having refractive indices different from each other are in contact with each other,
   wherein the refractive index of the first medium located on the first-surface-side of the refractive index interface is higher than the refractive index of the second medium located on the reflection-surface-side of the refractive index interface, and
   regarding the fluorescence traveling from the wavelength conversion section toward the reflection section, an angular distribution of the fluorescence having passed through the refractive index interface is narrower than the angular distribution of the fluorescence before passing through the refractive index interface.

2. The wavelength conversion element according to claim 1, wherein the refractive index interface is formed of a second surface of the wavelength conversion section that is a surface opposite the first surface thereof or a first surface of the bonding section that is a surface located on a side facing the wavelength conversion section.

3. The wavelength conversion element according to claim 2,
   further comprising a first refractive index section provided between the wavelength conversion section and the bonding section, wherein the wavelength conversion section is made of the first medium, and the first refractive index section is made of the second medium.

4. A light source apparatus comprising:
the wavelength conversion element according to claim 3; and
an excitation light source that emits the excitation light.

5. A projector comprising:
the light source apparatus according to claim 4;
a light modulator that modulates light from the light source apparatus in accordance with image information to form image light; and
a projection system that projects the image light.

6. The wavelength conversion element according to claim 2,
further comprising a second refractive index section provided between the wavelength conversion section and the bonding section,
wherein the second refractive index section is made of the first medium, and the bonding section is made of the second medium.

7. A light source apparatus comprising:
the wavelength conversion element according to claim 6; and
an excitation light source that emits the excitation light.

8. A projector comprising:
the light source apparatus according to claim 7;
a light modulator that modulates light from the light source apparatus in accordance with image information to form image light; and
a projection system that projects the image light.

9. A light source apparatus comprising:
the wavelength conversion element according to claim 2; and
an excitation light source that emits the excitation light.

10. A projector comprising:
the light source apparatus according to claim 9;
a light modulator that modulates light from the light source apparatus in accordance with image information to form image light; and
a projection system that projects the image light.

11. The wavelength conversion element according to claim 1,
further comprising a first refractive index section so provided between the wavelength conversion section and the bonding section as to be in contact with the bonding section; and
a second refractive index section so provided between the wavelength conversion section and the bonding section as to be in contact with the wavelength conversion section,
wherein the first refractive index section is made of the second medium, and the second refractive index section is made of the first medium.

12. A light source apparatus comprising:
the wavelength conversion element according to claim 11; and
an excitation light source that emits the excitation light.

13. A projector comprising:
the light source apparatus according to claim 12;
a light modulator that modulates light from the light source apparatus in accordance with image information to form image light; and
a projection system that projects the image light.

14. The wavelength conversion element according to claim 1, wherein the refractive index interface has a shape containing a plurality of pyramids.

15. The wavelength conversion element according to claim 14, wherein a bottom surface of each of the pyramids has a polygonal shape.

16. A light source apparatus comprising:
the wavelength conversion element according to claim 14; and
an excitation light source that emits the excitation light.

17. The wavelength conversion element according to claim 1, wherein the reflection section is formed of a dielectric multilayer film.

18. The wavelength conversion element according to claim 1, further comprising a substrate so provided as to be in contact with the reflection section.

19. A light source apparatus comprising:
the wavelength conversion element according to claim 1; and
an excitation light source that emits the excitation light.

20. A projector comprising:
the light source apparatus according to claim 19;
a light modulator that modulates light from the light source apparatus in accordance with image information to form image light; and
a projection system that projects the image light.

* * * * *